United States Patent [19]
Yamaguchi

[11] Patent Number: 5,765,160
[45] Date of Patent: Jun. 9, 1998

[54] OBJECT-ORIENTED DATABASE, A METHOD FOR REGISTERING TRIGGERS FOR PROCESSING AT END OF A TRANSACTION

[75] Inventor: Hirohisa Yamaguchi, Mission Viejo, Calif.

[73] Assignee: Unisys Corp., Blue Bell, Pa.

[21] Appl. No.: 691,166

[22] Filed: Aug. 1, 1996

[51] Int. Cl.$^6$ .................................................. G06F 17/30
[52] U.S. Cl. .................................... 707/103; 707/100
[58] Field of Search ................................ 707/103, 100

[56] References Cited

U.S. PATENT DOCUMENTS 5,408,657  4/1995  Bigelow et al. ................... 707/100
5,680,614  10/1997  Bakuya et al. ..................... 707/103

OTHER PUBLICATIONS

Wang et al., "A Framework for Handling Errors During the Execution of Trigger Rules for an Active Object–Oriented DBMS", IEEE Proc. Fourth Int. Workshop on Reasearch Issues in Data Eng., pp. 132–136, Feb. 14, 1994.

Karadimice et al., "Refined Triggering Graphs: A Logic--Based Approach to Termination Analysis in Active Object-Oriented Database", IEEE Proc. of the Twelfth Int. Conf. on Data Eng., pp. 384–391, Feb. 26, 1996.

Lieuwen et al., "The Ode Active Database: Trigger Semantics and Implementation", IEEE Proc. of the Twelfth Int. Conf. on Data Eng., pp. 412–420, Feb. 26, 1996.

Primary Examiner—Thomas G. Black
Assistant Examiner—Greta L. Robinson
Attorney, Agent, or Firm—J. Ronald Richebourg; Mark T. Starr; Steven R. Petersen

[57] ABSTRACT

The disclosed invention is a computer-implemented method for registering triggers for processing at the end of each transaction occurring in a database. This method positions a class where a given object exists; and for each trigger in the class, a determination is made if the trigger is in a trigger list of an object link. If it is not, a determination is made if a given object is in an object link of a transaction. If it is not, then the given object is inserted into the object link of the transaction; and then the trigger is inserted in a list of the object link. These steps are repeated until all triggers in the class have been processed. A determination is next made if there is a superclass of the class. If yes, then a superclass, is positioned and the steps are repeated for each trigger in the superclass (i.e., polymorphic trigger). Finally, if no superclass of the class exist, then the method is exited.

16 Claims, 9 Drawing Sheets

OBJECT-ORIENTED DATABASE, A METHOD FOR REGISTERING TRIGGERS FOR PROCESSING AT END OF A TRANSACTION

FIELD OF THE INVENTION

The present invention generally relates to stored procedures for use in databases, and in particular to the registering of triggers found during the processing of an event and delaying execution thereof until the transaction is complete.

BACKGROUND OF THE INVENTION

A trigger is a special kind of stored procedure that is automatically executed whenever a pre-specified event occurs. The event may be any type of modification of the data stored in a database. For example, an insert to the database is an event. Likewise, an update or delete of the data in the database is an event. The method of the present invention solves the problem one may encounter in a series of queries in a single transaction. A transaction is a logical unit of work. A user may choose to execute an entire work in a single transaction, or to cancel an entire work in a single transaction. In other words, a database will be logically complete at the end of a transaction because either all changes or no changes are executed. This method guarantees a logical completeness of a database at the end of a transaction, and not in the middle of the transaction. In fact, it is meaningless if a database management system ("DBMS") attempts to guarantee logical completeness in the middle a transaction, since the transaction is still incomplete. Once again, a transaction will be complete only at the end thereof.

For example, assume that there is a rule as follows: A minimum number of employees for a department shall be at least 10. Then consider the following situation. To start with there are 10 employees in a department, then two employees move away to another department and three employees move into the department as follows:

Begin the transaction

Move an employee to another department (1)

Move an employee to another department (2)

Move an employee into the department (3)

Move an employee into the department (4)

Move an employee into the department (5) End of transaction

The rule is only met at the end of the transaction, i.e., the number of employees in the department will be 11 (i.e., at least 10) at the end. If the DBMS executes a trigger to enforce this rule after statement (1), a rule is violated at this moment in time. The method of this invention solves this problem by postponing a trigger execution until the end of the transaction (i.e., after all events or statements). The number of employees in the department would be 11 after all events.

Another example could involve salary constraints. A maximum salary of $100,000 per employee per year in the department is set, while a maximum for the manager is set at $120,000 per year. The manager class is a subclass of Employee, that is the manager class inherits a trigger of MaxSalary from the employee class, but an inherited trigger enforces only $100,000. If an employee is a manager, the maximum salary must be increased to $120,000. The Max-Salary trigger is a polymorphic trigger, that is if an object is an employee, it enforces $100,000, while it also enforces $120,000 if an object is a manager.

When an object data base management system ("ODBMS") manipulates an object, a manager object is a member of manager class as well as an employee class. The ODBMS can manipulate a manager object as an employee object as well. For example, to give a ten percent (10%) raise to all employees would be:

Update Employee set salary=salary*1.1;

This statement gives a ten percent (10%) raise to everybody, even a manager gets a 10% raise. If a 10% raise exceeds $100,000, it violates the rule unless an object is a manager. A polymorphic trigger takes care of what an object type is. That is, if an object is an employee, it applies MaxSalary in the Employee class; and if an object is in a manager class, it applies MaxSalary in the Manager class.

SUMMARY OF THE INVENTION

The problem addressed by the present invention deals with the automatic execution of a trigger during a transaction, which may involve many events. In most instances, if a trigger is executed before the transaction is complete then the integrity of the data stored in the database has been violated. That is, a trigger may be executed prematurely during a transaction, which may generate a false error condition when no such error exists at the end of the transaction. Also, in the case of a polymorphic trigger an ambiguity could occur as to which condition must be satisfied (e.g., in the example above where an employee is also a manager).

Accordingly, it is an object of this invention to provide a method for improving the performance of databases.

Another object of this invention is to provide a method for avoiding false errors during a transaction.

Yet another object of this invention is to provide a method registering all triggers that may occur during a transaction, and executing those triggers at the end of such transaction.

The method of the present invention is useful in a computer system having a memory, at least one storage media coupled to the system, the storage media has stored therein a database. The program of this invention is stored in the memory for registering triggers for processing at the end of each transaction occurring in the database. This program comprises a method for executing the steps of: positioning a class where a given object exists; for each trigger in the class, determining if the trigger is in a trigger list of an object link, and if not; determining if a given object is in an object link of a transaction, and if not; inserting the given object into the object Link of the transaction; inserting the trigger in a list of the object link; repeating the above steps until all triggers in the class have been processed; determining if there is a superclass of the class, and if yes;

positioning a superclass, and repeating the above steps for each trigger in the superclass (i.e., a polymorphic trigger); and, if no superclasses of the class exist, then exiting the program.

The foregoing and other objects, features and advantages of this invention will be apparent from the following more particular description of the preferred embodiments of the invention as illustrated in the accompanying drawings.

DETAILED DESCRIPTION OF ONE EMBODIMENT

Figure 1:
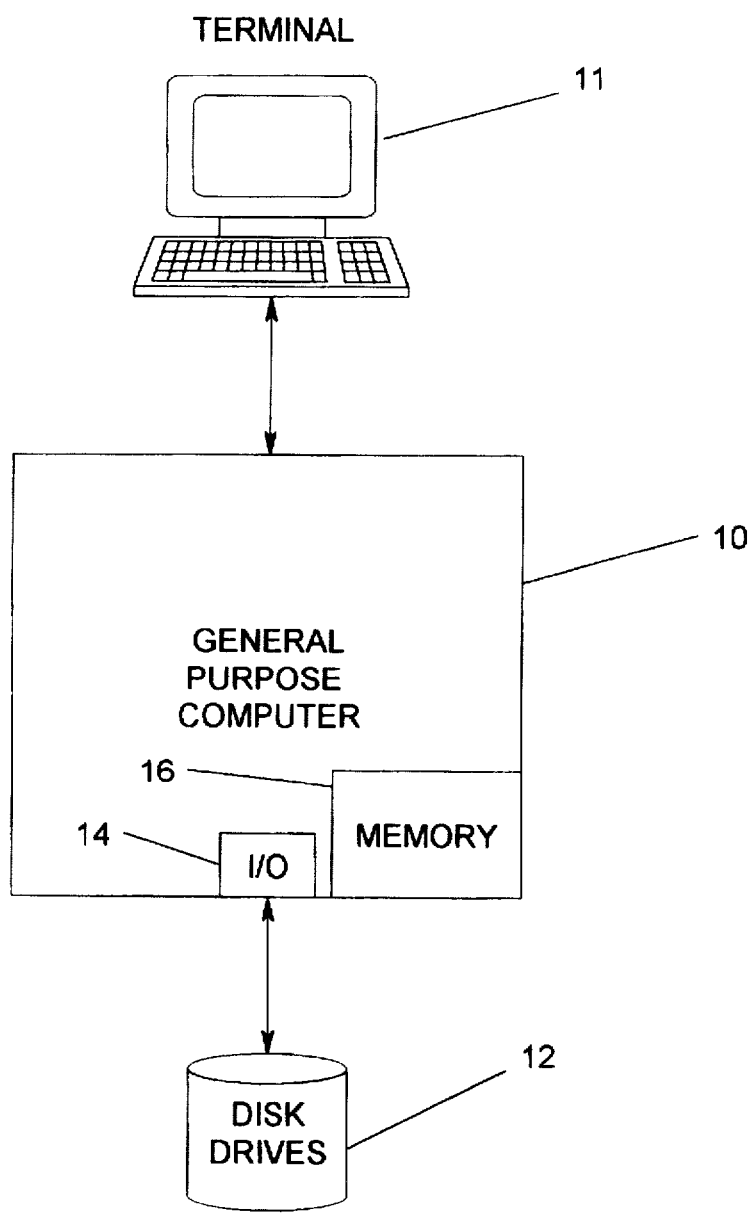
FIG. 1 is an general diagram of a computer system having a storage media and a memory.

Before proceeding with a detailed description of the method of the present invention a background discussion of object-oriented repositories would be helpful. This discussion will focus on the terminology used herein. Background information that may be helpful in understanding the present invention may be had by reference to an issued U.S. Pat. No. 5,408,657 entitled METHOD OF IMPOSING MULTI-OBJECT CONSTRAINTS ON DATA FILES IN A DATA PROCESSING SYSTEM by Richard Bigelow and John Thompson, and assigned to the same assignee hereof.

Object Terminology

A normal object program stores objects in the computer system's memory. When the program terminates, the memory used by those objects is freed and reused by other programs, making the objects that the program stored transient. An object database stores objects on a computer disk. Since the information on a computer disk remains in existence, even when the computer is turned off, an object database provides the ability to persistently store objects. An object program that uses an object database thus has the option of storing objects transiently or persistently.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. But, if the customer opened multiple accounts, the customer's name and address would appear in multiple account objects. Therefore, it is desirable to define a separate customer object and place the name and address as attributes of the customer object. The customer account object would then contain a reference to the customer object.

A class is a set of objects with similar attributes and behavior. Every managed object instance has a class association with it. An object is an instance of its class. Stated otherwise, a class is a template of objects of similar nature. A superclass is a managed class from whose specification another class (i.e., its subclass) is derived. Inheritance is the conceptual mechanism by which features are acquired by a subclass from its superclass.

The present invention is described herein as a part of an Object-Oriented/Relational Database, referred to as OSMOS, which database is available from Unisys Corporation, assignee hereof. However, it is pointed out that the present invention is useful in any database employing automatic triggers.

Referring now to the drawings and FIG. 1 in particular, a computer system 10 is shown with a user terminal 11 coupled thereto providing interface with the system. A storage media, such as a disk drive 12, is coupled to the system 10 through an I/O channel 14. A memory 16 is included within the system 10 for storing data and software programs such as that of the present invention.

Figure 2A:
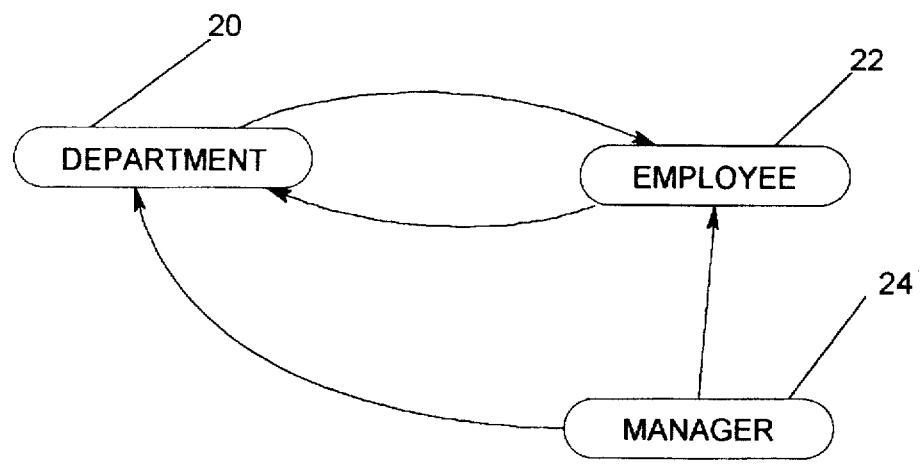
FIG. 2A is a diagram that illustrates an example where the method of the present invention is useful.

Referring now to FIG. 2A, an example is diagrammed for illustrating the general concept of the operation performed by the method of the present invention, wherein a Department 20 includes a number of Employees 22, and the Department is managed by a Manager 24. By way of example, a constraint is placed on the number (e.g. 10) of Employees 22 allowed within the Department 20. Another constraint is placed on the maximum salary (e.g. $100,000) of Employees 22 and a maximum salary of the Manager 24 is set at $120,000. These constraints are enforced by triggers, which comprise a stored procedure that is automatically executed whenever the constraint is not met. Using the object terminology hereof, Employees 22 are referred to herein as a class while the Department is referred to herein as a target class. Also, the Employees 22 are a superclass of the Manager class 24.

Figure 2B:
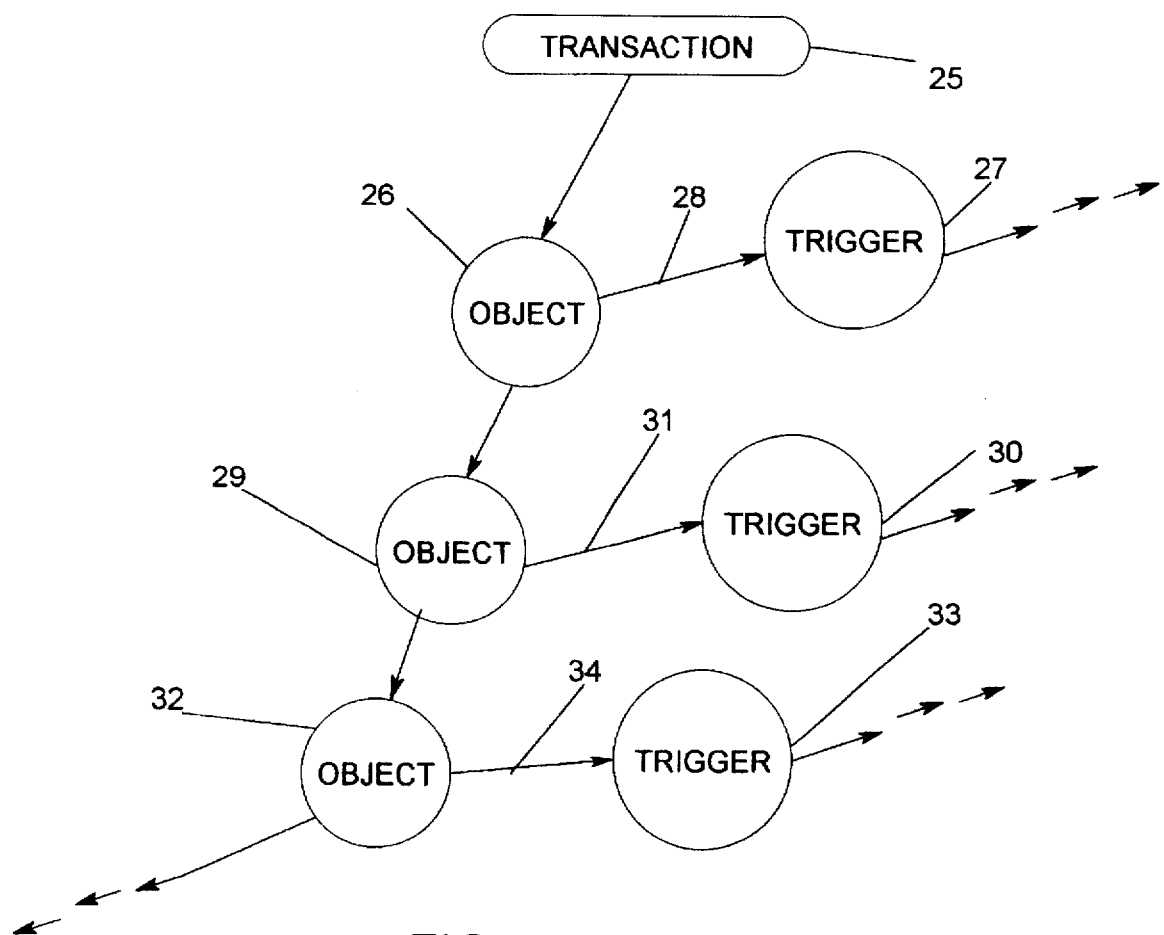
FIG. 2B is a diagram of an object link including a trigger list for each object in the link.

FIG. 2B illustrates an object link including a trigger list for each object in the link, which is the result of a registration process of the present invention, wherein a transaction is denoted by a bubble 25. The first object 26 detected with a trigger 27 is stored with a link 28 to the trigger. The next object 29 detected with a trigger 30 is stored with a link 31 to the trigger. This process is repeated for object 32 including its respective trigger 33 and link 34. This registration process continues during the processing of the event. However, the triggers are executed in the sequence detected before a transaction is committed. The objects 26, 29 and 32, etc. form an object link, while trigger 27 is the beginning of a trigger list from the object 26. In a similar manner, the trigger 30 is the beginning of a trigger list from the object 29.

Trigger Setup

When the Object Definition Language ("ODL") for the OSMOS is parsed, OSMOS creates a meta-schema that contains all the internal and external schema information. When a trigger is parsed for a class, OSMOS establishes a link between the trigger and the class. An example for the schema shown below, the EmployeeAge trigger is linked to the Employee class only, while the MaximumSalary trigger is linked to both the Employee and the Manager classes.

Polymorphic Trigger

As shown in the Schema Sample below, both the Employee and the Manager classes have a trigger called MaximumSalary. However, each class has a different rule for calculating the maximum salary. Even though the trigger name is the same, the implementation is different. This is an example of a polymorphic trigger.

When a query is processed OSMOS registers triggers for each object affected by the query and when the transaction is committed, OSMOS fires the trigger. In the trigger registration process, OSMOS always searches for a trigger by moving up the class hierarchy; that is, by moving from the subclass up through all the superclasses. This process is referred to herein as positioning, which process allows OSMOS to find the most specific version of each trigger.

Assuming that the schema looks like the example set forth below, when an object in the Manager class is updated OSMOS searches for triggers in the Manager class and finds the trigger MaximumSalary. OSMOS registers this trigger and then continues up through the class hierarchy looking for additional triggers to register. OSMOS finds the MaximumSalary trigger in the Employee class but does not register the trigger because a more specific version of the trigger MaximumSalary is already registered.

Schema Sample

```
Create Concrete Class Department (
    Member         SET(Employee)   inverse WorksFor,
    Managed        Manager  inverse Manages,
    Function       MinimumMember (me Department)
                   External Name 'MethodLib:MinimumMember'
                   LANGUAGE "C++"
                   TRIGGER ON COMMIT
)
Create Concrete Class Employee (
    WorksFor       Department inverse Member,
    Birthday       integer,
    Salary         Integer,
    Function       EmployeeAge (me Employee)
                   External Name 'MethodLib:EmployeeAge'
                   Language "C++"
                   TRIGGER ON COMMIT,
    Function       MaximumSalary (me Employee)
                   External       Name
'MethodLib:MaximumEmployeeSalary'
                   Language "C++"
                   TRIGGER ON COMMIT
)
Create Concrete Class Manager UNDER Employee (
    Manages        Department inverse Managed,
    Function       MaximumSalary (me Manager)
                   External       Name
'MethodLib:MaximumManagerSalary'
                   Language "C++"
                   TRIGGER ON COMMIT
)
```

Figure 3:
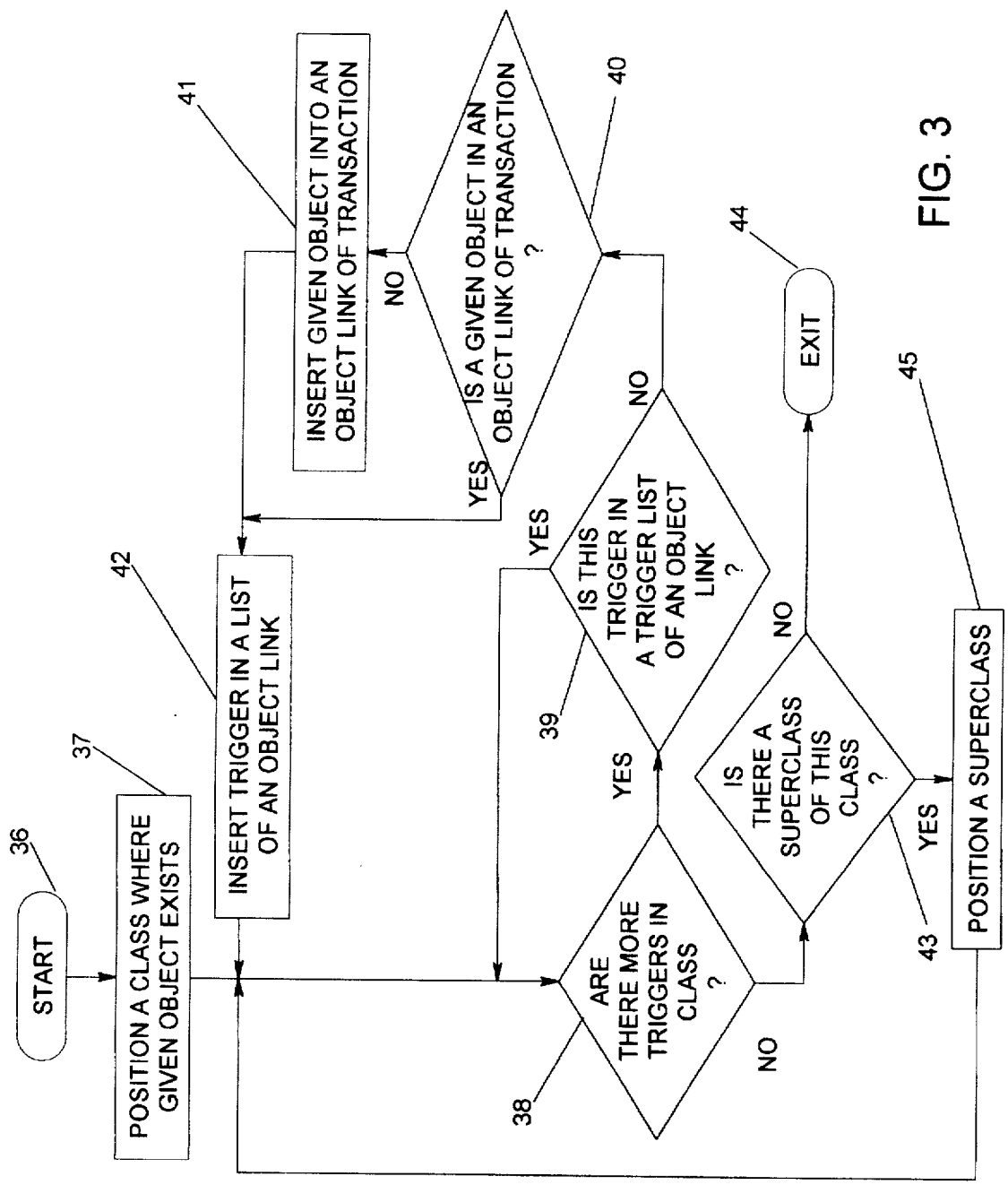
FIG. 3 is a flow chart illustrating trigger registration.

Referring now to FIG. 3, a flow chart of a trigger registration is illustrated. The process begins with a start bubble 40 followed by a process step of positioning a class where a given object exists (block 37). Next, an inquiry is made as to whether or not there are more triggers in the class (diamond 38). If there are more triggers, then another inquiry is made as to whether or not this trigger is in a trigger list of an object link (diamond 39). For example, trigger 27 of object 26 in FIG. 2B. If the answer to this inquiry is no, then yet another inquiry is made as to whether or not a given object in an object link is a part of a transaction (diamond 40). If the answer to this inquiry is no, then a process step of inserting a given object into an object link of a transaction is performed (block 41). That is, the object is added to a link such as that shown in FIG. 2B. Once this step is complete, or if the answer to the inquiry in the diamond 40 is yes, then a process step of inserting a trigger in a list of an object link is performed (block 42), such as adding the trigger 27 to the object 26 (FIG. 2B).

After the trigger is inserted into a list of an object link a return is made back to the diamond 38 for processing the next trigger in the class. Once all of the triggers have been processed (i.e., the no exit is taken from the diamond 38), then an inquiry is made as to whether or not there is a superclass of this class (diamond 43). If the answer to this inquiry is no, then an exit is taken from the process as depicted by a bubble 44. On the other hand, if there is a superclass of this class, then a process step of positioning a superclass is performed (block 45). After this step has been performed, then a return is made back to the entry to the diamond 38 for processing of the next trigger in the class.

Figure 4:
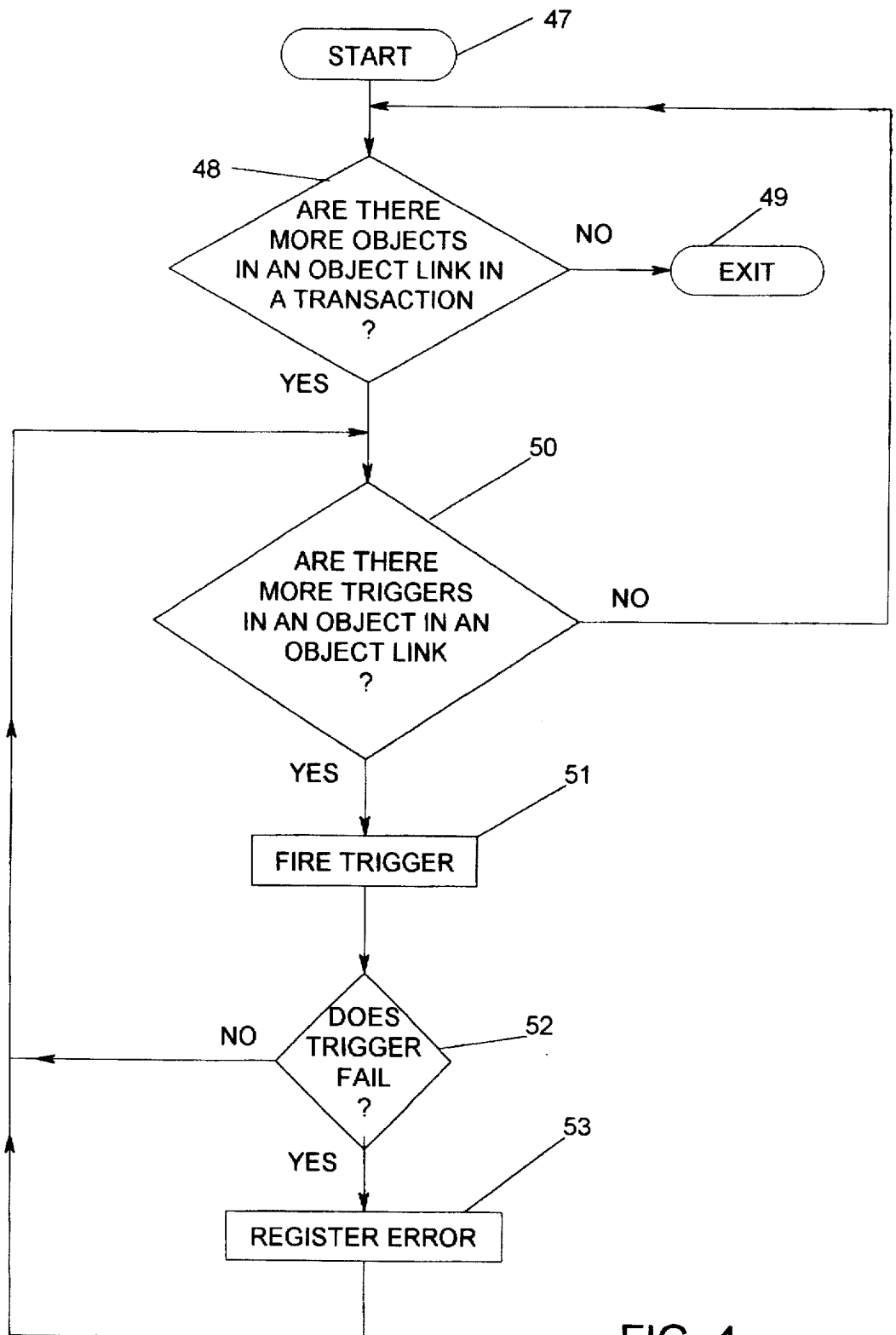
FIG. 4 is a flow chart illustrating the firing of a trigger.

Referring now to FIG. 4, a flow chart is shown of the firing of a trigger. The process begins with a start bubble 47, followed by an inquiry as to whether or not there are more objects in an object link in a transaction (diamond 48). If the answer to this inquiry is no, then an exit is taken from this process as depicted by a bubble 49. On the other hand, if there are more objects in an object link in a transaction then another inquiry is made as to whether or not there are more triggers in an object in an object link (diamond 50). If the answer to this inquiry is no, then a return is made back to the entry to the diamond 48 for processing of the next object.

On the other hand, if the answer to this inquiry is yes, the trigger is fired as depicted by a process block 51. After this, yet another inquiry is made as to whether or not the trigger failed (diamond 52). If the answer to this inquiry is no, then a return is made back to the entry to the diamond 50 for processing of the next trigger. On the other hand, if the answer to this inquiry is yes (i.e., the trigger failed), then the error is registered (block 53). Following this, a return is made back to the entry to the diamond 50 for processing of the next trigger in an object in an object link.

Figure 5:
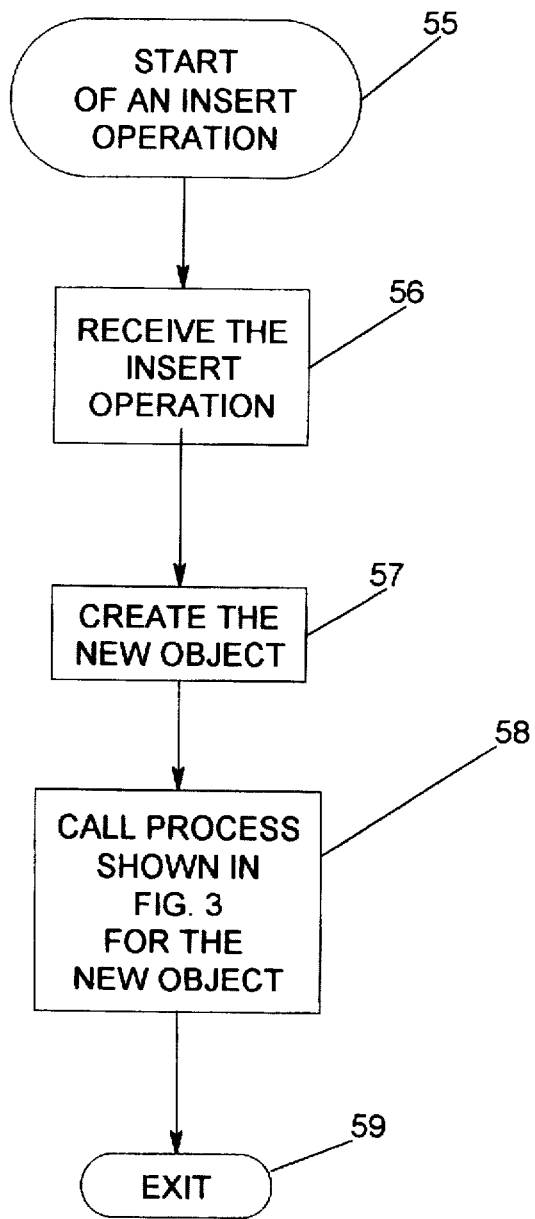
FIG. 5 is a flow chart illustrating an insert operation.

Referring now to the FIG. 5, a flow chart of an insert operation is shown. This is the first of three figures that illustrate how a trigger is processed for each Object Level Interface ("OLI") operation. The OLI interface is a programmatic interface to the OSMOS database. The process begins with a start bubble 55 followed by a process step of receiving the insert operation (block 56). Next, a process step of creating the new object is performed (block 57). After this, the process shown in FIG. 3 is called for trigger registration of the new database object (block 58). Finally the process is exited as depicted by a bubble 59.

Figure 6:
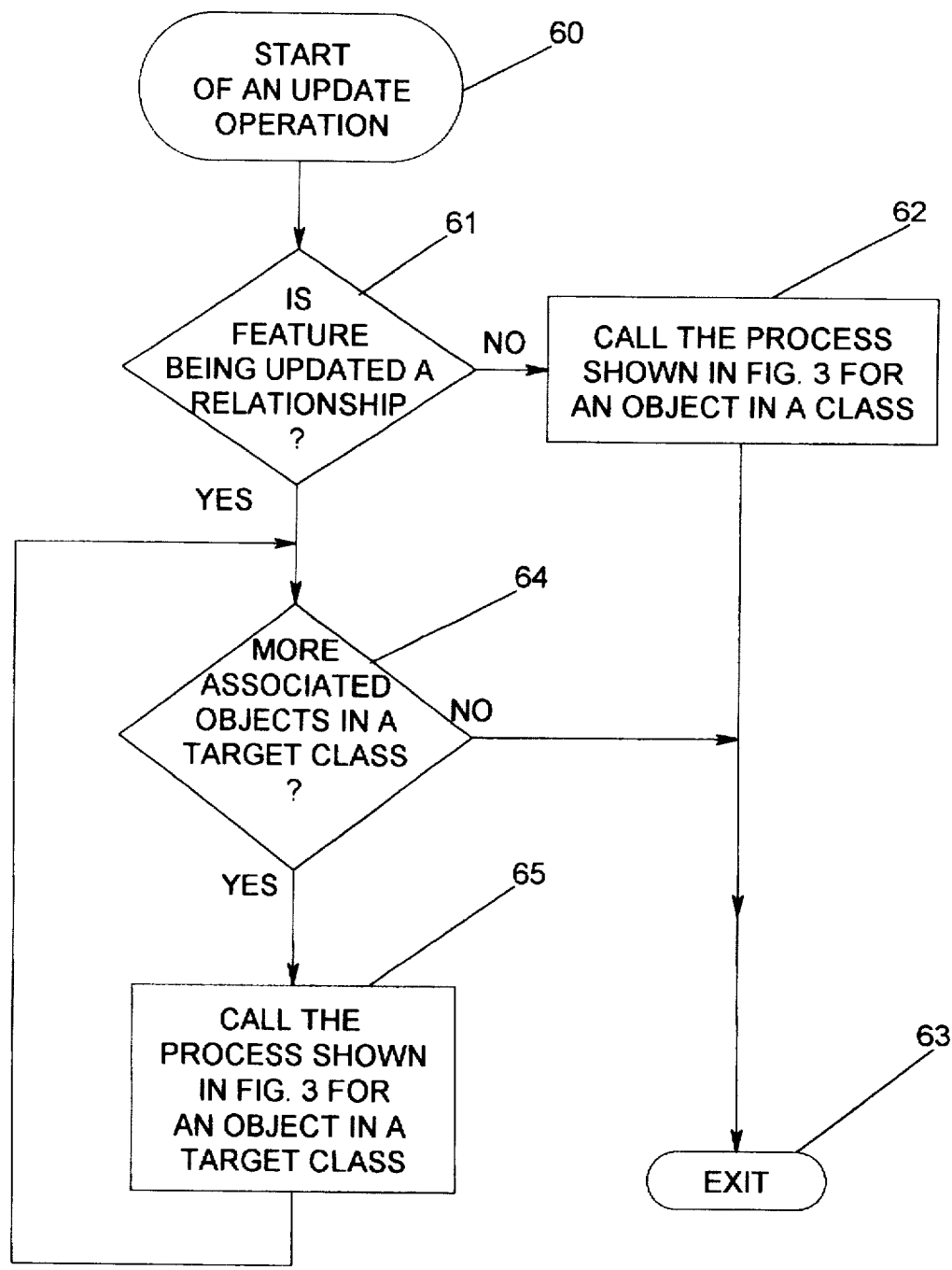
FIG. 6 is a flow chart illustrating an update operation

Referring now to FIG. 6, a flow chart of an OLI update operation is illustrated. For an update operation, OSMOS alters information of a feature in a class. Each update operation alters one feature only. If a feature is a relationship, the update operation affects objects in a target class (i.e., the target class is a class which is related to the class being updated. For example, the Department 20 is the target class for the Employee 22 class (FIG. 2A). OSMOS receives the update operation; gets the object; and if the feature being updated is not a relationship, OSMOS registers any triggers associated with the object.

If the feature being updated is a relationship, for each associated object in the target class, OSMOS registers any triggers associated with the objects in the target class. The pseudo code for this operation is as follows:

```
If a feature being updated is a relationship
    For each associated object in a target class
        Perform a trigger registration with an object
    in a target class
    else
        Perform a trigger registration with this object
```

The process begins with a start bubble 60 followed by an inquiry as to whether or not the feature being updated is a relationship (diamond 61). That is, an inquiry is being made as to whether or not it has been explained in a previous statement. If the answer to this inquiry is no, then a process step of performing a trigger registration (i.e., calling the process shown in FIG. 3) with this object is executed (block 62). Once this step is complete an exit is taken from the process as depicted by an exit bubble 63. On the other hand, if the feature being updated is a relationship (i.e., yes exit from the diamond 61) then another inquiry is made as to whether or not there are more associated objects in a target class (diamond 64). If the answer to this inquiry is no then an exit is taken from the process (bubble 63).

On the other hand, if there are more associated objects in a target class, then a process step of performing a trigger registration (by calling the FIG. 3 process) with an object in a target class is executed (block 65). Once this process step is complete, a return is made back to the entry to the diamond 64 for processing of the next associated object in the target class.

Figure 7:
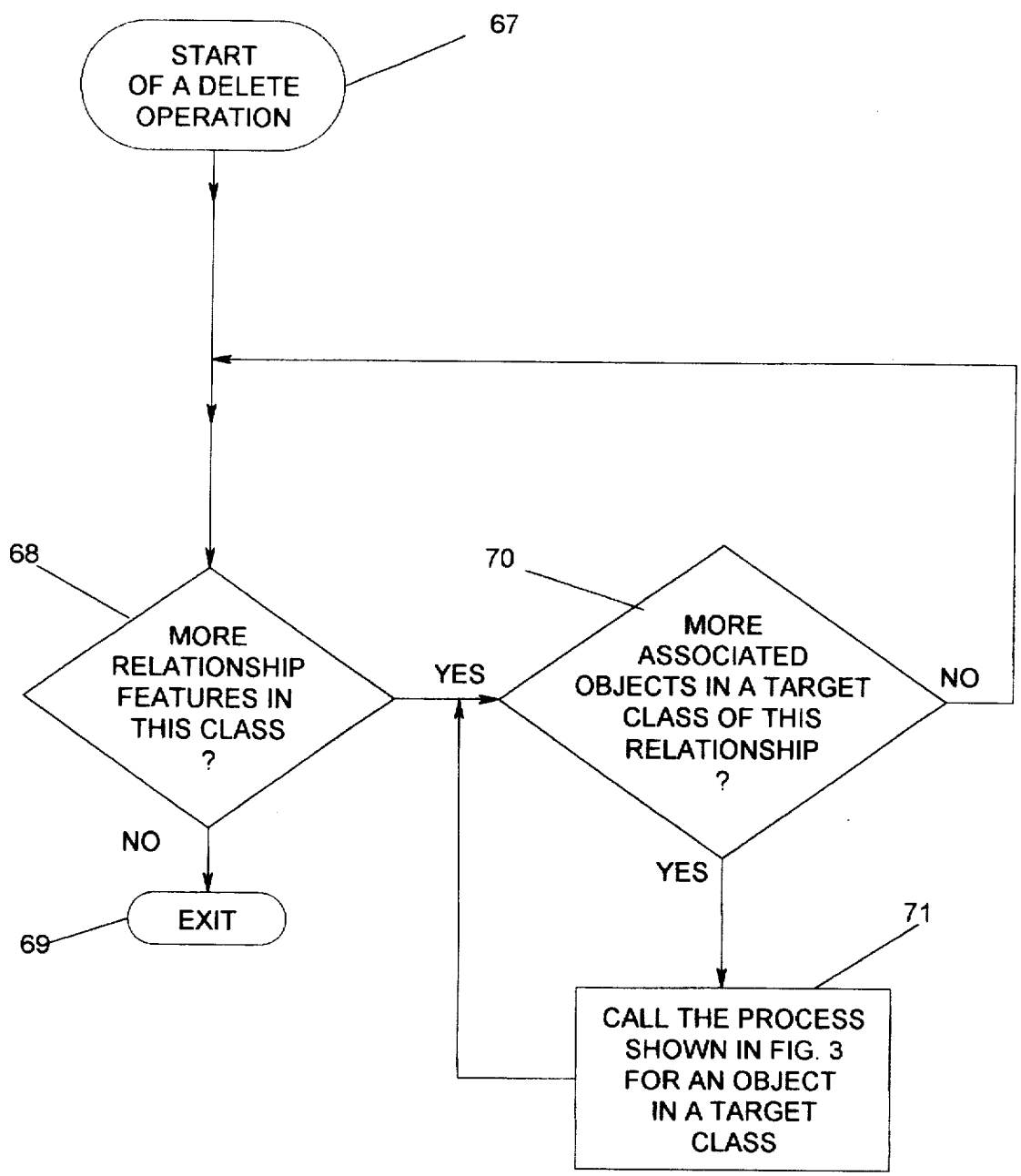
FIG. 7 is a flow chart illustrating a delete operation.

Referring now to FIG. 7, a flow chart of a delete operation is illustrated. For a delete operation, OSMOS removes an object from a class. If the class has relationships, information in the target class is also updated. For each delete operation, OSMOS receives the delete operation; gets the object; registers the triggers for the object being deleted if the class has relationships; and then OSMOS registers the triggers in the target classes. The pseudo code for this operation is set forth below:

```
If this class has relationships
  For each relationship feature in this class
    For each associated object in a target class of
this relationship
      Perform a trigger registration for an
object in a target class
```

The process begins with a start bubble 67 followed by an inquiry as to whether or not there are more relationship features in this class (diamond 68). If the answer to this inquiry is no, then an exit is taken from the process as depicted by a bubble 69. On the other hand, if the answer to this inquiry is yes then another inquiry is made as to whether or not there are more associated objects in a target class of this relationship (diamond 70). If the answer to this inquiry is no, then a return is made back to the entry to the diamond 68 for processing of the next relationship feature.

On the other hand, if there are more associated objects in a target class of this relationship (i.e., the yes exit of the diamond 70) then the process shown in FIG. 3 is called for an object in a target class (block 71). Once this process step has been completed, then a return is made back to the entry to the diamond 70 for processing of the next associated object.

Figure 8:
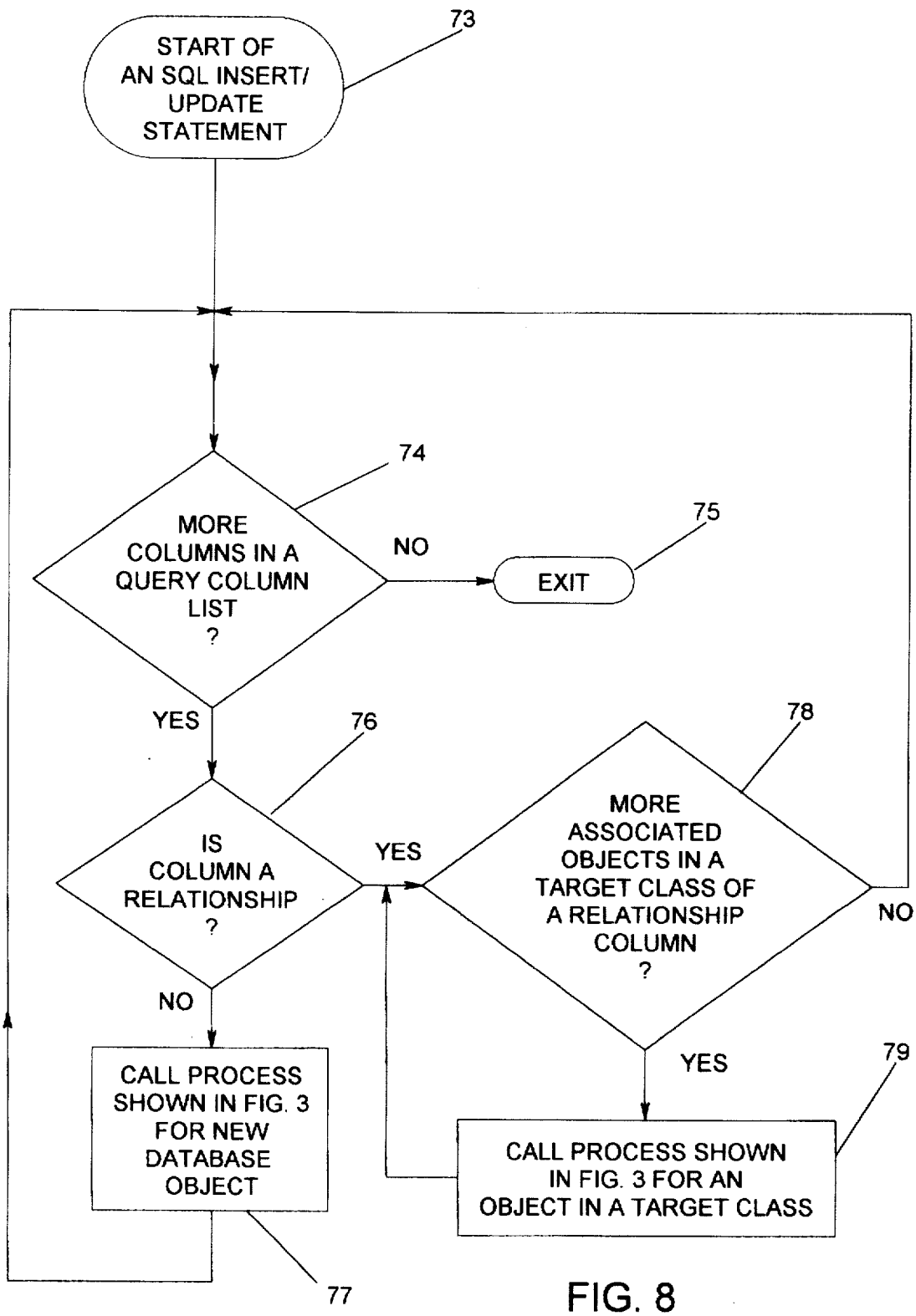
FIG. 8 is a flow chart illustrating an SQL insert/update statement.

Referring now to FIG. 8, a flow chart of an SQL insert/update statement is illustrated. It is pointed out at this juncture of the description that the process steps for both an insert and an update statement are identical. Hence, the flow chart in FIG. 8 represents either an insert or an update process. OSMOS can process SQL statements, as outlined hereinbelow. For more information on the SQL process and terminology reference is made to a book entitled "THE GUIDE TO SQL SERVER 2nd Edition, by Aloke Nath and published by Addison-Wesley Company of Menlo, Park, Calif. Moreover, SQL is both an ANSI and an ISO standard.

For each SQL insert statement, OSMOS receives the insert statement; creates the new object; registers triggers for the new object and for each column in the target list. If a column is a relationship, OSMOS also registers triggers for each associated object in the target class. The pseudo code for this operation is as follows:

```
For each column in a query column list
  If a column is a relationship
    For each associated object in a target class of
a relationship column
```

```
      Perform a trigger registration for an object
in a target class
    Else perform a trigger registration for the new
object
```

The process begins with a start bubble 73 followed by an inquiry as to whether or not there are more columns in a query column list (diamond 74). If the answer to this inquiry is no, then an exit is taken from the process as depicted by a bubble 75. On the other hand, if there are more columns in a query column list (i.e., the yes exit is taken from the diamond 74) then another inquiry is made as to whether or not the column is a relationship (diamond 76). If the answer to this inquiry is no, then the process shown in FIG. 3 is called for the new database object (block 77).

On the other hand, if the answer to this inquiry is yes, then still another inquiry is made as to whether or not there are more associated objects in a target class of a relationship column (diamond 78). If the answer to this inquiry is no, then a return is made back to the entry to the diamond 74 for processing the next column in a query column list. On the other hand, if the answer to this inquiry is yes, then the process shown in FIG. 3 is called for performing a trigger registration for an object in a target class (block 79). Once this step has been performed a return is made back to the entry to the diamond 78 for processing of the next associated object.

Figure 9:
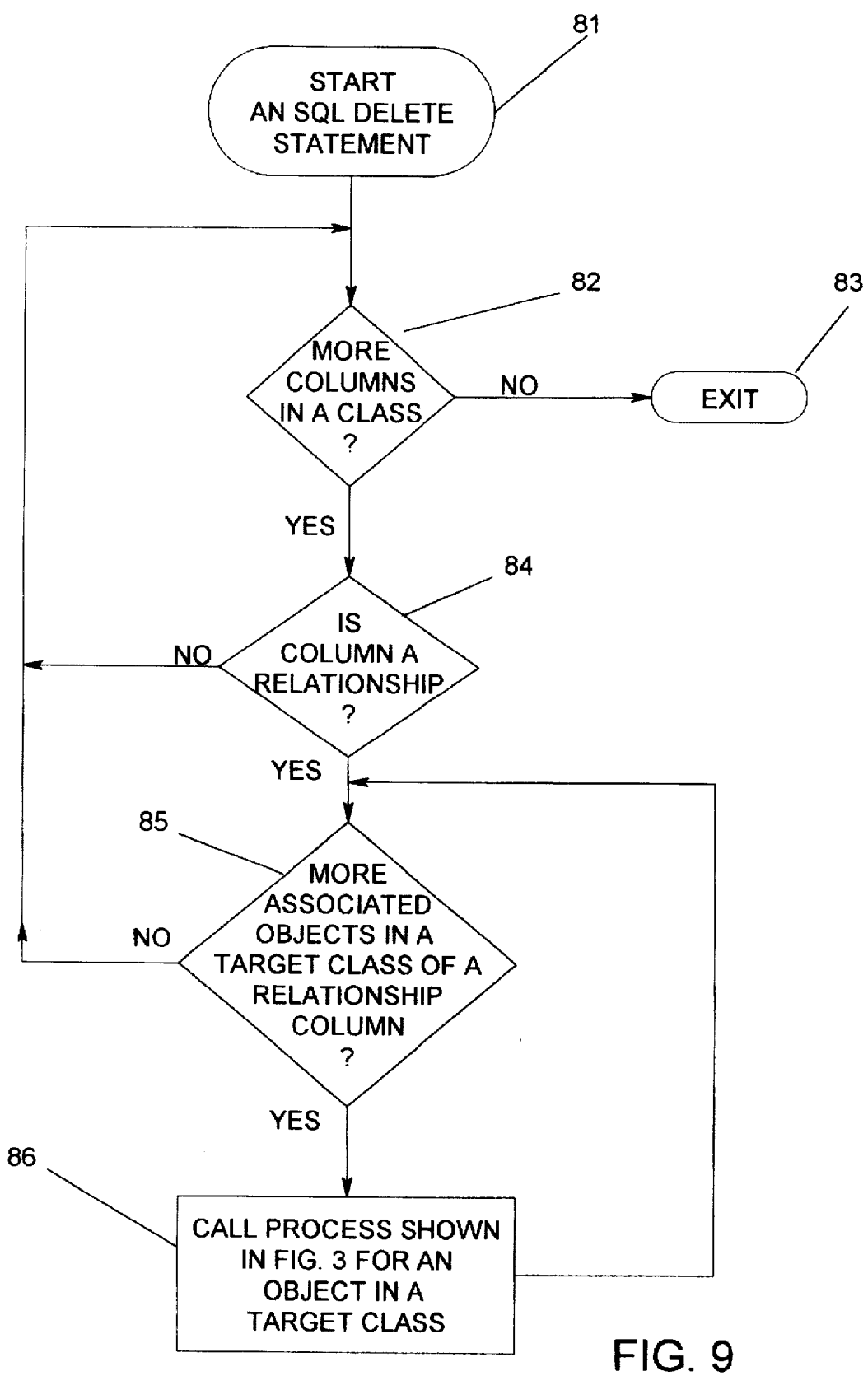
FIG. 9 is a flow chart illustrating an SQL delete statement.

Referring now to FIG. 9, a flow chart of an SQL delete statement is illustrated. For each SQL delete statement, OSMOS receives the delete statement; gets the object; and, delete the object. If the deleted object has relationships, OSMOS registers the triggers for each associated object in the target class. The pseudo code for this operation is as follows:

```
For each relationship in a class
  For each associated object in a target class of
a relationship column
    Perform a trigger registration for an object
in a target class
```

The process begins with a start bubble 81 followed by an inquiry as to whether or not there are more columns in a class (diamond 82). If the answer to this inquiry is no, then an exit is taken from the process as depicted by a bubble 83. On the other hand, if there are more columns in a class then another inquiry is made as to whether or not the column is a relationship (diamond 84). If the answer to this inquiry is no, then a return is made back to the entry to the diamond 82 for processing of the next column in the class.

On the other hand, if the column is a relationship then yet another inquiry is made as to whether or not there are more associated objects in a target class of a relationship column (diamond 85). If the answer to this inquiry is no, then a return is made back to the entry to the diamond 82 for processing of the next column in the class. On the other hand, if there are more associated objects in the target class, then the process shown in FIG. 3 is called for trigger registration of an object in a target class (block 86). Once this process step has been performed, then a return is made back to the entry to the diamond 85 for processing of the next associated object in the target class.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system having a memory, at least one storage media coupled to said system, said storage media having stored therein a database, a program stored in said memory for registering triggers for processing at end of each transaction occurring in said data base, said program comprising a method executing the steps of:
   a. positioning a class where a given object exists;
   b. for each trigger in said class, determining if said trigger is in a trigger list of an object link, and if not;
   c. determining if a given object is in an object link of a transaction, and if not;
   d. inserting said given object into said object link of said transaction;
   e. inserting said trigger in a list of said object link;
   f. repeating steps b through e hereof until all triggers in said class have been processed;
   g. determining if there is a superclass of said class, and if yes;
   h. positioning a superclass, and repeating steps b through g hereof for each trigger in said superclass;
   i. if no superclasses of said class exist, then exiting said program.

2. A method as in claim 1 further comprising the steps of:
   a. for each object in said object link in said transaction, and for each trigger in said object link;
   b. firing said trigger;
   c. determining if said trigger has failed to execute, and if not;
   d. repeating steps a and b hereof for each object and for each trigger;
   e. if said trigger has failed to execute, registering an error; and,
   f. once all objects in said object link in said transaction have been processed, exiting said program.

3. A method as in claim 1 wherein for an insert data operation of said database, executing the following steps:
   a. receiving said insert operation from a user program;
   b. creating a new database object;
   c. performing all steps of claim 1 for processing said new database object; and
   d. exiting said program.

4. A method as in claim 1 wherein for an update operation on an object in said database, executing the following steps:
   a. determining if feature being updated is a relationship, and if not;
   b. if said feature being updated is a relationship, then for each associated object in a target class performing all steps of claim 1; and,
   c. when all associated objects have been processed, exiting said program.

5. A method as in claim 1 wherein for a delete operation on an object in said database, executing the following steps:
   a. for each relationship feature in said class, and for each associated object in a target class of this relationship, performing all of the steps of claim 1 for each associated object in said target class; and,
   b. once all relationship features in said class have been processed, exiting said program.

6. A method as in claim 1 wherein for an SQL insert operation, executing the following steps:
   a. for each column in a query column list, determining if a column is a relationship, and if so;
   b. for each associated object in a target class of a relationship column, performing all of the steps of claim 1 for processing an object in a target class;
   c. once all associated objects in said target class of said relationship column have been processed, repeating steps a and b hereof;
   d. if said column is not a relationship, performing all of the steps of claim 1 for said new database object, and repeating all the preceding steps hereof; and
   e. once there are no more columns in a query column list, exiting said program.

7. A method as in claim 6 wherein said operation is an SQL update operation.

8. A method as in claim 1 wherein for an SQL delete statement, executing the following steps:
   a. for each relationship column in a class, determining if said column is a relationship, and if not repeating this step;
   b. if said column is a relationship and for each associated object in a target class of a relationship column, performing the steps of claim 1 hereof for an object in a target class;
   c. once all relationship columns in a class have been processed, exiting said program.

9. In a computer system having a memory, at least one storage media coupled to said system, said storage media having stored therein a database, a program stored in said memory for registering triggers for processing at end of each transaction occurring in said data base, said program comprising a method executing the steps of:
   a. positioning a class where a given object exists;
   b. for each trigger in said class, determining if said trigger is in a trigger list of an object link, and if not;
   c. determining if a given object is in an object link of a transaction, and if not;
   d. inserting said given object into said object link of said transaction;
   e. inserting said trigger in a list of said object link;
   f. repeating steps b through e hereof until all triggers in said class have been processed;
   g. determining if there is a superclass of said class, and if yes;
   h. positioning a superclass, and repeating steps b through g hereof for each trigger in said superclass;
   i. if no superclasses of said class exist, then for each object in said object link in said transaction, and for each trigger in said object link, firing said trigger; and,
   j. exiting said program.

10. A method as in claim 9 further including the steps of:
    a. determining if said trigger has failed to execute, and if not;
    b. repeating step i of claim 9 for each object in said object link and for each trigger in said trigger list;
    c. if said trigger has failed to execute, registering an error; and,
    d. once all objects in said object link in said transaction have been processed, exiting said program.

11. A method as in claim 9 wherein for an insert data operation of said database, executing the following steps:

a. receiving said insert operation from a user program;

b. creating a new database object;

c. performing steps a through i of claim 9 for processing said new database object; and d. exiting said program.

12. A method as in claim 9 wherein for an update operation on an object in said database, executing the following steps:

a. determining if feature being updated is a relationship, and if not;

b. if said feature being updated is a relationship, then for each associated object in a target class performing steps a through i of claim 9; and, c. when all associated objects have been processed, exiting said program.

13. A method as in claim 9 wherein for a delete operation on an object in said database, executing the following steps:

a. for each relationship feature in said class, and for each associated object in a target class of this relationship, performing steps a through i of claim 9 for each associated object in said target class; and, b. once all relationship features in said class have been processed, exiting said program.

14. A method as in claim 9 wherein for an SQL insert operation, executing the following steps:

a. for each column in a query column list, determining if a column is a relationship, and if so;

b. for each associated object in a target class of a relationship column, performing steps a through i of claim 9 for processing an object in a target class;

c. once all associated objects in said target class of said relationship column have been processed, repeating steps a and b hereof;

d. if said column is not a relationship, performing steps a through i of claim 9 for said new database object, and repeating all the preceding steps hereof; and e. once there are no more columns in a query column list, exiting said program.

15. A method as in claim 14 wherein said operation is an SQL update operation.

16. A method as in claim 9 wherein for an SQL delete statement, executing the following steps:

a. for each relationship column in a class, determining if said column is a relationship, and if not repeating this step;

b. if said column is a relationship and for each associated object in a target class of a relationship column, performing the steps a through i of claim 9 hereof for an object in a target class;

c. once all relationship columns in a class have been processed, exiting said program.

* * * * *